July 19, 1949.  W. W. SIMMONDS  2,476,390
POST DRIVER

Filed May 26, 1947  4 Sheets-Sheet 1

Inventor
Wayne W. Simmonds
By Fishburn & Mullendore
Attorneys,

July 19, 1949.  W. W. SIMMONDS  2,476,390
POST DRIVER
Filed May 26, 1947  4 Sheets—Sheet 2
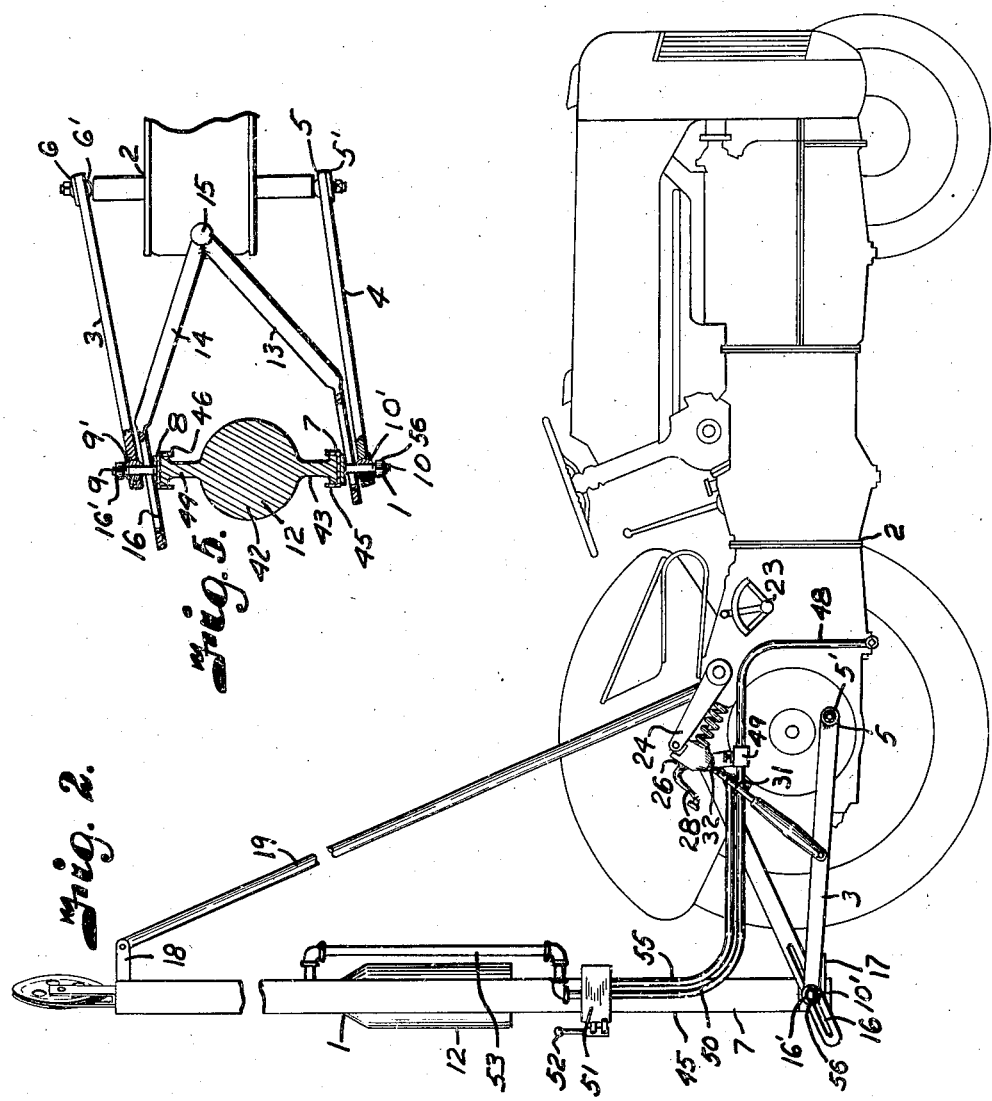
Inventor
Wayne W. Simmonds
By Fishburn & Mullendore
Attorneys

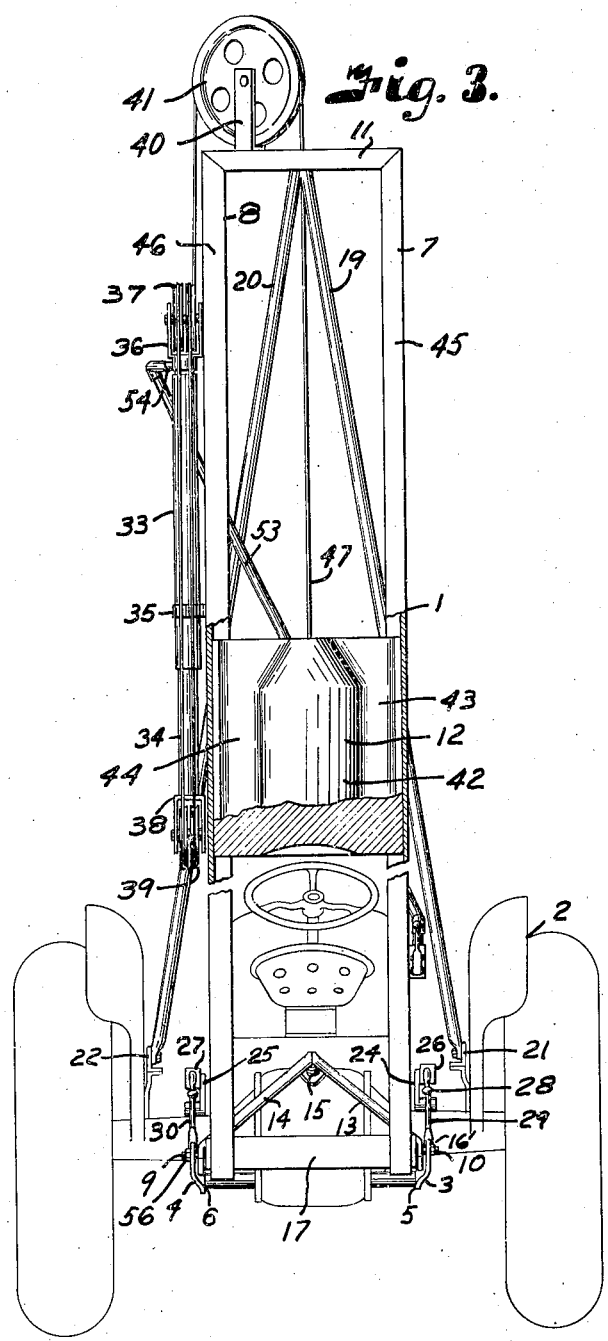

July 19, 1949. W. W. SIMMONDS 2,476,390
POST DRIVER
Filed May 26, 1947 4 Sheets-Sheet 4
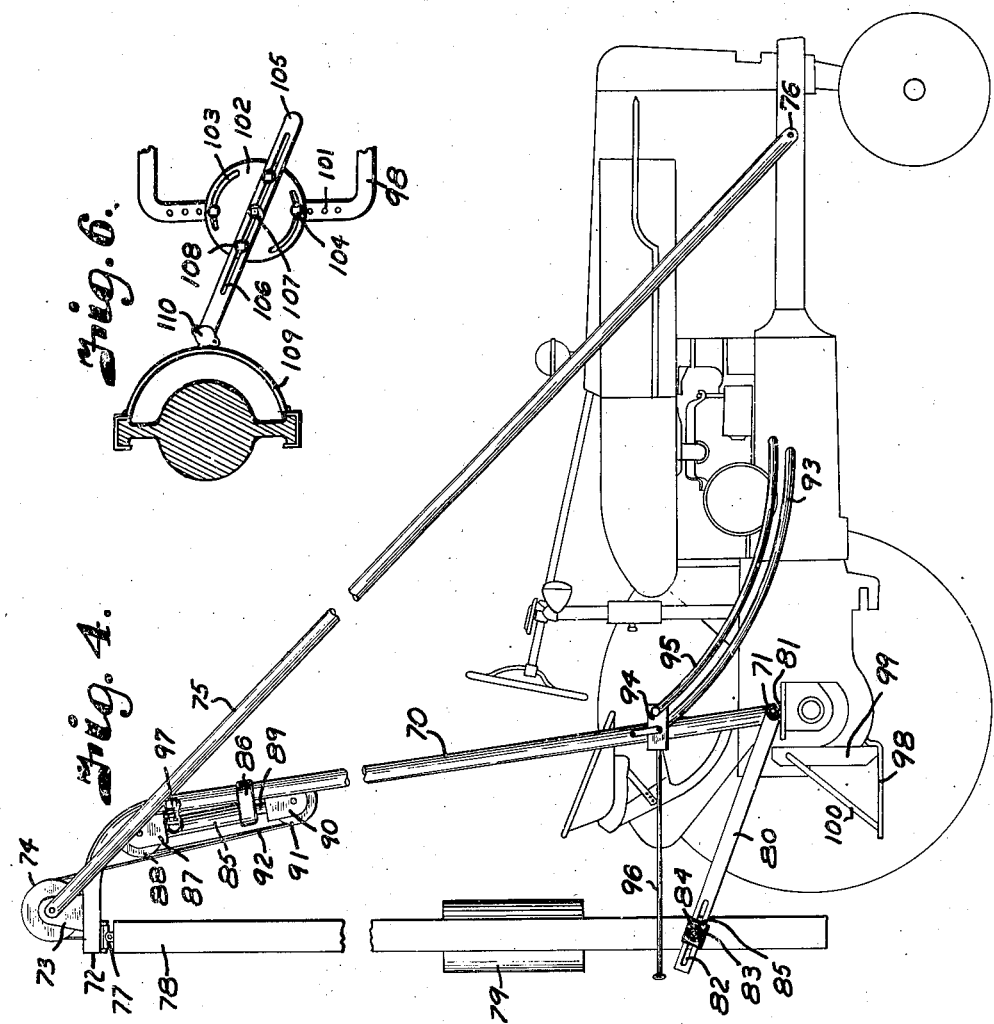
Inventor
Wayne W. Simmonds
By Fishburn & Mullendore,
Attorneys Patented July 19, 1949

2,476,390

UNITED STATES PATENT OFFICE 2,476,390

POST DRIVER

Wayne W. Simmonds, Lawrence, Kans., assignor to John H. Lucas, Kansas City, Mo., trustee for Wayne W. Simmonds, Arlie J. Simmonds, and John J. Simmonds Application May 26, 1947, Serial No. 750,420

9 Claims. (Cl. 61—73)

1

This invention relates to mechanism for driving posts, and more particularly to an attachment for tractors including a driver operated hydraulically for sinking the posts in the earth.

The principal object of the present invention is to provide an improved attachment for tractors adapted to be utilized as a post or pile driver, and particularly adapted for attachment to the rear of a tractor adjustable for driving a post vertically when the tractor is on uneven ground.

Other objects of the present invention are to provide a post driver hydraulically operated by the fluid from the tractor; to provide a trackway adapted to be mounted on a tractor which may be tilted so that a post may be driven into the ground vertically or at an angle; to provide hydraulic means for raising a driving weight to the upper limit of its motion and dropping the same by release of the hydraulic fluid; to provide for pivotally mounting an attachment frame to the tractor for carrying the trackway; and to provide a device of this character simple, economical to manufacture, and efficient in operation.

In accomplishing these and other objects of the present invention, I have provided improved details of structure, the preferred form of which is illustrated in the accompanying drawings, wherein:

Fig. 2 is a side elevational view of the device with the tractor wheels removed to better illustrate the invention.

Fig. 3 is a rear elevational view of the device.

Fig. 4 is a side elevational view of a modified form of my invention with the wheel of the tractor removed to better illustrate the invention.

Fig. 5 is a plan view partly in cross section particularly illustrating the pivotal connection of the drawbars.

Fig. 6 is a plan view partly in cross section of a modified form of the invention particularly illustrating the pivotal connection of the trackway to the rear of the tractor.

Figure 1:
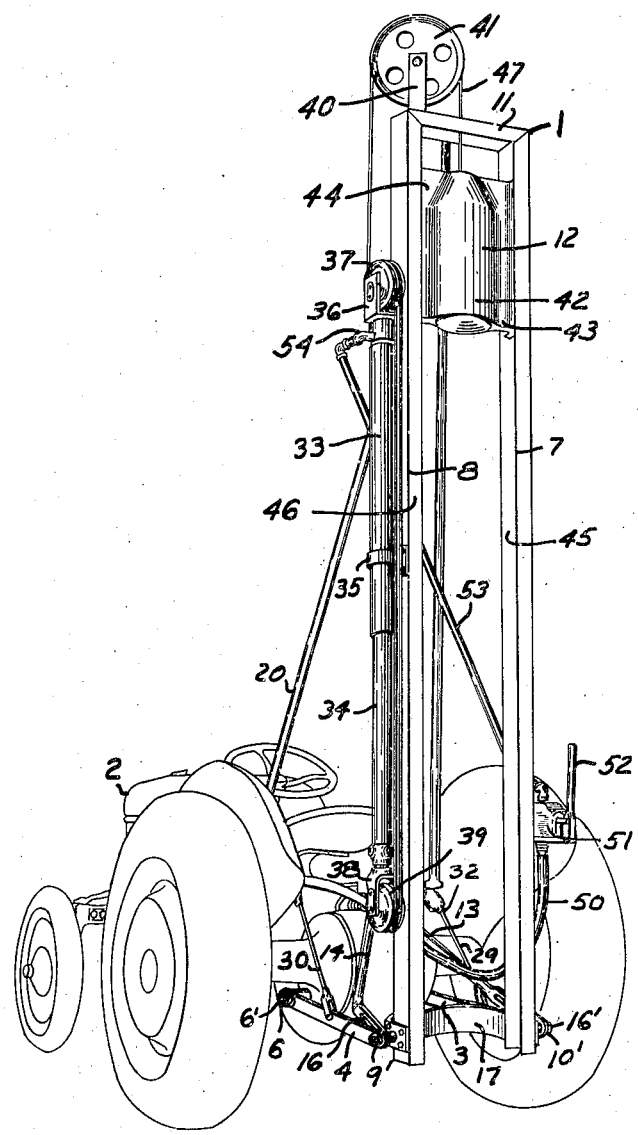
Fig. 1 is a perspective view of my invention showing it attached to the rear of a tractor.

Referring more in detail to the drawings:

1 designates a post driver embodying the features of my invention adapted to be attached to a tractor or the like as indicated at 2. The device consists of a framework structure including drawbars 3 and 4 located at the back of the tractor and extending rearwardly thereof. The forward ends of the drawbars are pivotally attached to the lower side of the rear axle housing as indicated at 5 and 6 (Figs. 1 and 2), the pivotal connection preferably being on each side

2 of the differential of the tractor by ball and socket joint as indicated at 5' and 6'. Upright members 7 and 8 are pivotally connected to the rear ends of the drawbars 3 and 4 by stud bolts or the like 9 and 10 also by ball and socket joint as indicated at 9' and 10'. The upright members are channel-shaped and have a cross bar 11 at their upper ends, the channel members forming a guide for a hammer or impact member 12 as will later be described.

Braces 13 and 14 are provided having their forward ends pivotally attached to the top side of the rear axle housing in any suitable manner as indicated at 15 (Fig. 3). The rear ends of the braces 13 and 14 are slotted as indicated at 16 (Fig. 2) and adapted to engage over the bolts 9 and 10 inside of the drawbars 3 and 4 (Figs. 1 and 2), the braces thus being attached to the bottom of the hammer guide by the stud bolts, the stud bolts being welded to the lower ends of the upright members 7 and 8 and provided with threads adapted to receive nuts 16'. Tightening of the nuts will hold the braces and bars in functional contact on the bolts to hold the frame in rigid position. The upright members 7 and 8 are held in rigid position on the rear ends of the brace members by a connecting bar or collar 17 which is circular in cross section and extends forwardly from the lower ends of the upright members so that the post to be driven may be set between the upright members.

Extending forwardly from substantially the center of the cross bar 11 of the upright members is an arm 18 which is pivotally attached to forwardly extending braces 19 and 20 having their lower ends pivotally attached to brackets or the like 21 and 22 carried by the rear axle housing as best illustrated in Fig. 3. The braces 19 and 20 are pivotally attached at their respective ends to the upper part of the upright members and the frame of the tractor.

A valve 23 is provided alongside the engine of the tractor for controlling a hydraulic cylinder (not shown) which is built in the tractor as is conventional practice. The cylinder is adapted to operate arms 24 and 25 connected to the cylinder. The rear ends of the arms 24 and 25 are pivotally connected to housings 26 and 27 (Fig. 2) provided with the usual gearing and cranks 28 for operating the gearing. Attached to the lower side of the housing are drag links 29 and 30 having their lower ends pivotally connected to the drawbars 3 and 4. The upper ends of the links are provided with threads as indicated at 31 and engage in threaded members in the housings 26 and 27 as indicated at 32 which engage the gearing so that the length of the links may be adjusted as desired by turning of the cranks 28. While I have here illustrated two adjustable links and cranks, it will be obvious that only one may serve my purpose.

In order to raise and lower the hammer 12 in the upright guide frame, I preferably provide a hydraulic cylinder 33 having a plunger 34 adapted to be operated by fluid from the motor of the tractor. The cylinder is rigidly secured outside of the upright member 8 by a bracket 35, the upper end of the cylinder having a sheave block 36, the inside of which is also rigidly secured to the upright member 8 by welding or other suitable means. The bracket or sheave block 36 is provided with sheaves or pulleys 37 and the lower end of the plunger 34 is also provided with a sheave or pulley block 38 adapted to receive pulleys 39. A bracket 40 is rigidly secured to the cross member 11 near the side of the upright member carrying the cylinder 33 and upon which is mounted a pulley or sheave 41.

The hammer 12 may be of any desired shape, but I have here shown a substantially cylindrical center portion 42 having side flanges 43 and 44 adapted to engage in the channels 45 and 46 formed by the uprights 7 and 8. Attached to the upper side of the hammer 12 in any suitable manner is a cable 47 adapted to run over pulley 41 and over the pulleys 37 and 39 and having its opposite end secured to the sheave block 36 in any suitable manner. I have here illustrated sheaves 37 and 39 so that a double line of cable may engage thereover, although a single line may be used if desired.

Hydraulic fluid for operating the cylinder is provided through a pump (not shown) and which is carried by the tractor as is the usual practice. A line 48 leads from the pump to a valve 49 (Fig. 2) and a line 50 leads from the pump to a control valve 51 provided with an actuating lever 52. A line 53 connects between the control valve 51 and the upper end of the cylinder 33 as indicated at 54 for supply of the fluid back of the piston 34 for actuating said piston. A return line 55 is connected between the control valve 51 and the fluid supply reservoir of the tractor.

To adjust the hammer guide in vertical position, the nuts 16' on the stud bolts 9 and 10 may be loosened and the needle valve 49 is closed. By operation of the tractor valve 23 the cylinder carried by the motor will act to raise or lower the arms 24 and 25 to move the upright frame fore and aft. When the guide frame is in the desired position tightening of the nuts 56 will hold the frame comprising the drawbars and forwardly extending bracing members 19 and 20 in rigid position. The slots 16 in the ends of the braces 13 and 14 allow for the fore and aft adjustment and the forwardly extending braces 19 and 20 being pivoted at their upper and lower ends will also allow movement of the guide frame. The links 29 and 30 may be adjusted by the cranks 28 and one of these links may be adjusted independently of the other to allow for sidewise or lateral tilting of the upright guide frame members.

In making fore and aft adjustment the tractor control valve 23 is placed in neutral or hold position and the valve 49 in the high pressure line 48 is closed. Operation of the tractor control valve 23 will raise or lower the frame structure and when the desired angle is reached, the control valve 23 is again placed in hold position. The nuts 16' on the studs are tightened and the valve 49 is opened, the tractor control valve 23 is placed in raised position and the device is then ready for operation.

The control valve 51 has three positions, one to raise the hammer, one to lower the hammer and the neutral or hold position. Raising and lowering of the hammer is manipulated through operation of the control valve lever 52. When the hammer is raised through operation of the lever, return of the lever to lowered position will open the port on the return side of the valve and the return lines are of a diameter to allow the hammer to fall freely without back pressure or restriction from the fluid in the cylinder. The ratio of travel between the piston and hammer is such that it will allow the hammer to travel the full length of the guide from the head frame to the ground. The length of stroke of the hammer may be regulated by the control valve.

In Fig. 4 I have illustrated a modified form of my invention wherein the guide frame is pivotally mounted on the supporting frame which in turn is mounted to the tractor. In this form 70 designates tubular members rigidly mounted on the upper side of the rear axle housing as indicated at 71, the upper ends of the tubular members being curved rearwardly and provided with a cross head 72. Extending upwardly from the tubular members are brackets 73 for mounting a pulley 74. Extending forwardly from the brackets 73 are braces 75 having their forward ends rigidly secured to the respective sides of the tractor frame as indicated at 76.

Pivotally suspended from the cross head 72 by universal joint or the like as indicated at 77 is a guide frame 78 for a hammer 79. The guide frame 78 comprises two channel members having a cross head providing trackways as in the preferred form of the invention in which the hammer is adapted to slide. Fore and aft adjustment of the frame is accomplished by braces 80 pivotally attached to brackets 81 on the axle housing. The rear ends of the braces are provided with slots 82 for receiving stud bolts 83 secured to the upright members of the frame 78 by ball and socket joint as indicated at 84 by nuts 85. When the nuts are loosened the upright framework may be moved fore and aft to adjust the frame to the desired position and then tightening of the nuts 84 will hold the frame in rigid position.

A hydraulic cylinder 85 is rigidly secured to the tubular members 70 by brackets 86. The upper end of the cylinder is provided with a sheave block 87 for accommodating a pulley 88. The cylinder is provided with a plunger 89 having a pulley block 90 for receiving a pulley 91. A cable 92 has one of its ends attached to the hammer 79 in any suitable manner. The cable runs over pulley 74, thence over pulleys 88 and 91 and has its opposite end rigidly secured to the upper end of the cylinder in any suitable manner.

In this form of the invention fluid is supplied by the motor of the tractor to one of the tubular members 70 which is adapted to contain fluid for supplying the same to the cylinder. Supply line 93 leads from the fluid supply to a control valve 94 having connection with the tubular members 70 (Fig. 4). A return line 95 leads from the control valve back to the fluid supply. A lever 96 is provided for manipulation of the valve 94, and 97 designates a connection from the tubular brace member 70 to the upper end of the cylinder back of the plunger.

Operation of the hammer in this form of the invention is substantially similar to the preferred form after the desired alignment of the guide frame for the hammer is made. Opening of the control valve 94 by lever 96 allows fluid to flow through tubular member 70 and to cylinder 85 to operate the plunger to raise the hammer. Release of the fluid through operation of the control valve will allow the hammer to fall, the fluid returning from the cylinder through tubular member 70 and return line 94 to the fluid supply in the motor.

In Fig. 6 I have shown a further modified form of pivotally attaching the lower end of the guide frame 78 to the rear of the tractor. 98 designates a drawbar having its forward end secured to the tractor by suitable braces 99 and 100. The drawbar is provided with a plurality of openings 101 and secured thereto is a circular plate 102 having grooves 103 for connection to the drawbar 98 by bolts 104. A connecting bar 105 having a slot 106 is pivotally mounted on the drawbar 98 by a bolt 107 and provided with nuts for tightening of the plate to the drawbar. Bolts 108 are adapted to engage in the slot 106 and to the plate 102 to rigidly hold the bar in any desired position relative to the plate. The bolts 104 also may be tightened to hold the plate in the desired position. The lower ends of the uprights of the framework 78 are provided with a connecting bar or collar 109 substantially circular in cross section and the connecting bar 105 is attached to the rear side of the bar 109 by ball and socket joint 110. By loosening of the bolts 104, 107 and 108 the framework structure 78 will pivot to substantially vertical position and then tightening of the bolts will hold the same in substantially rigid position.

It will be obvious that the upright frame structure 78 may also be held at an angle, either fore or aft, or laterally for use in driving posts, stakes or the like in the ground at an angle, such as tent stakes and the like.

It will be obvious from the foregoing that I have provided an improved hydraulically operated mechanism for post drivers which may be quickly and easily attached to a tractor, the vertical alignment of the driver adjusted, and the raising and lowering of the hammer hydraulically operated from the fluid of the tractor.

What I claim and desire to secure by Letters Patent is:

1. A tractor operated post driver comprising a vertical frame forming a trackway, means for pivotally mounting the frame on the tractor, means for adjusting the position of the trackway fore and aft and laterally of the tractor, a hammer having sides sliding in said trackway, and hydraulic means operable by the tractor for raising and releasing the hammer in the trackway for engaging the top of a post, said means including a cylinder and piston mounted on the side of said vertical frame, pulleys mounted on the upper end of the cylinder and the outer end of the piston, a cable having one end secured to the cylinder adjacent the pulleys and extending over said pulleys, and a pulley carried by the upper portion of said trackway adapted to receive said cable and the opposite end of said cable being attached to said hammer.

2. A tractor operated post driver comprising a vertical frame forming a trackway, means for pivotally mounting the frame on the tractor to adjust the position of the trackway fore and aft of the tractor, a hammer having sides sliding in said trackway, a cylinder rigidly secured to one side of said trackway, a piston in said cylinder, pulleys mounted on the upper end of said cylinder and the outer end of said piston, a pulley mounted on the upper end of said trackway, a cable having one end attached to said cylinder adapted to engage and run over said pulleys and having its opposite end attached to said hammer, means for supplying fluid from the tractor to said cylinder whereby said piston may be extended from the cylinder to raise said hammer, and means for releasing the fluid from the cylinder for dropping said hammer to engage the top of a post.

3. A tractor operated post driver comprising a vertical frame forming a trackway, means for pivotally mounting the frame on the tractor to adjust the position of the trackway fore and aft and laterally of the tractor, a hammer having sides sliding in said trackway, a cylinder rigidly secured to one side of said trackway, a piston in said cylinder, pulleys mounted on the upper end of said cylinder and the outer end of said piston, a pulley mounted on the upper end of said trackway, a cable having one end attached to said cylinder adapted to engage and run over said pulleys and having its opposite end attached to said hammer, means for supplying fluid from the tractor to said cylinder whereby said piston may be extended from the cylinder to raise said hammer, and means for releasing the fluid from the cylinder for dropping said hammer to engage the top of a post.

4. In a post driver for a tractor having a pair of laterally spaced vertically swingable power operated links trailingly pivoted on its rear end portion, in combination, an upwardly extending trackway having its lower end pivotally mounted on the free ends of the trailing links, brace means pivotally mounted on the tractor and having pivotal connection with the trackway above the trailing links whereby vertical swinging movement of the links adjusts position of the trackway fore and aft of the tractor, an impact member having side sliding in said trackway, and means operable by the tractor for raising and releasing said impact member for applying driving impact on the top of a post.

5. In a post driver for a tractor having a pair of laterally spaced vertically swingable links pivoted on its rear end portion and adjustable connections between said links and power operated devices for adjusting the relative vertical position of said links and transmitting power thereto, in combination, an upwardly extending trackway, means at the sides of the trackway adjacent the lower end thereof pivotally mounting the trackway on the free ends of the trailing links, means universally mounted on the tractor and having slotted arms adjustably secured to the trackway mounting means for adjusting the position of the trackway laterally of the tractor, brace means pivotally mounted on the tractor and having pivotal connection with the trackway above the trailing links whereby vertical swinging movement of the links adjusts position of the trackway fore and aft of the tractor, an impact member having sides sliding in said trackway, and means operable by the tractor for raising and releasing said impact member for applying driving impact on the top of a post.

6. In a post driver for a tractor having a pair of laterally spaced vertically swingable power operated links trailingly pivoted on its rear end portion, in combination, an upwardly extending trackway having its lower end pivotally mounted on the free ends of the trailing links, brace means pivotally mounted on the tractor and having pivotal connection with the trackway above the trailing links whereby vertical swinging movement of the links adjusts position of the trackway fore and aft of the tractor, an impact member having sides sliding in said trackway, an hydraulic fluid pressure means operated by the tractor for raising the impact member in the trackway, and means for releasing the fluid pressure whereby the impact member in the trackway will drop and apply driving impact on the top of a post.

7. In a post driver for a tractor having a pair of laterally spaced vertically swingable links pivoted on its rear end portion and adjustable connections between said links and power operated devices for adjusting the relative vertical position of said links and transmitting power thereto, in combination, an upwardly extending trackway, means at the sides of the trackway adjacent the lower end thereof pivotally mounting the trackway on the free ends of the trailing links, means universally mounted on the tractor and having slotted arms adjustably secured to the trackway mounting means for adjusting the position of the trackway laterally of the tractor, brace means pivotally mounted on the tractor and having pivotal connection with the trackway above the trailing links whereby vertical swinging movement of the links adjusts position of the trackway fore and aft of the tractor, an impact member having sides sliding in said trackway, an hydraulic fluid pressure means operated by the tractor for raising the impact member in the trackway, and means for releasing the fluid pressure whereby the impact member in the trackway will drop and apply driving impact on the top of a post.

8. In a post driver for a tractor having a pair of laterally spaced vertically swingable power operated links trailingly pivoted on its rear end portion, in combination, an upwardly extending trackway having its lower end pivotally mounted on the free ends of the trailing links, brace means pivotally mounted on the tractor and having pivotal connection with the trackway above the trailing links whereby vertical swinging movement of the links adjusts position of the trackway fore and aft of the tractor, an impact member having sides sliding in said trackway, a cylinder and piston, one member of which is stationary, means connecting the other cylinder and piston member to the impact member, an hydraulic means operated by the tractor and connected to the cylinder for applying fluid pressure thereto for raising the impact member in the trackway, and valve means between the hydraulic means and cylinder for controlling application of fluid pressure to the cylinder, said valve means and cylinder having a relatively large exhaust connection whereby operation of the valve means to release the fluid pressure will allow the impact member to drop and apply a driving impact on the top of a post.

9. In a post driver for a tractor having a pair of laterally spaced vertically swingable links pivoted on its rear end portion and adjustable connections between said links and power operated devices for adjusting the relative vertical position of said links and transmitting power thereto, in combination, an upwardly extending trackway, means at the sides of the trackway adjacent the lower end thereof universally mounting the trackway on the free ends of the trailing links, means universally mounted on the tractor and having slotted arms adjustably secured to the trackway mounting means for adjusting the position of the trackway laterally of the tractor, brace means pivotally mounted on the tractor and having pivotal connection with the trackway above the trailing links, whereby vertical swinging movement of the links adjusts position of the trackway fore and aft of the tractor, a hammer having sides sliding in said trackway, a cylinder and piston, one member of which is stationary, means connecting the other cylinder and piston member to the hammer, an hydraulic means operated by the tractor and connected to the cylinder for applying fluid pressure thereto for raising the hammer in the trackway, and valve means between the hydraulic means and cylinder for controlling application of fluid pressure thereto, said valve means and cylinder having a relatively large exhaust connection whereby operation of the valve means releases the fluid pressure to allow the hammer to drop and apply a driving impact on the top of a post.

WAYNE W. SIMMONDS.

REFERENCES CITED

The following references are of record in the file of this patent:

UNITED STATES PATENTS

| Number | Name | Date |
| --- | --- | --- |
| 2,040,668 | Nichols | May 12, 1936 |
| 2,056,744 | Smith | Oct. 6, 1936 |
| 2,392,027 | Cutrer | Jan. 1, 1946 |
| 2,399,190 | Kelly | Apr. 30, 1946 |
| 2,435,651 | Huber | Feb. 10, 1948 |